US008096665B2

(12) United States Patent
Bellis et al.

(10) Patent No.: US 8,096,665 B2
(45) Date of Patent: Jan. 17, 2012

(54) SPATIALLY OFFSET MULTI-IMAGER-PANEL ARCHITECTURE FOR PROJECTING AN IMAGE

(75) Inventors: Matthew William Bellis, Yokohama (JP); Dongmin Chen, Saratoga, CA (US); Gregory Allen Miller, Santa Rosa, CA (US)

(73) Assignee: Miradia, Inc., Santa Clara, CA (US)

( * ) Notice: Subject to any disclaimer, the term of this patent is extended or adjusted under 35 U.S.C. 154(b) by 810 days.

(21) Appl. No.: 11/871,152

(22) Filed: Oct. 11, 2007

(65) Prior Publication Data

US 2008/0088800 A1 Apr. 17, 2008

Related U.S. Application Data (60) Provisional application No. 60/851,105, filed on Oct. 11, 2006.

(51) Int. Cl.
*G03B 21/00* (2006.01)

(52) U.S. Cl. ............... 353/121; 353/20; 353/30; 353/31; 353/69; 353/85; 353/98; 353/99; 353/122; 345/1.3; 345/3.2; 345/3.3; 345/3.4; 345/699

(58) Field of Classification Search .................... 353/20, 353/30, 31, 69, 85, 94, 70, 98, 99, 101, 121; 353/122; 345/67, 87, 88, 89, 98, 99, 94, 345/96, 100, 147, 148, 149, 208, 210, 629–641, 345/1.1–1.3, 699, 3.2, 3.3, 3.4; 348/778, 348/779, 780, 798, 800, 801, 802, 803
See application file for complete search history.

(56) References Cited

U.S. PATENT DOCUMENTS

| 4,734,779 | A | * | 3/1988 | Levis et al. ............... 348/383 |
| 4,916,957 | A | | 4/1990 | Quermann |
| 5,331,454 | A | | 7/1994 | Hornbeck |
| 5,364,547 | A | | 11/1994 | Babb et al. |
| 5,412,186 | A | | 5/1995 | Gale |
| 5,429,708 | A | | 7/1995 | Linford et al. |
| 5,447,600 | A | | 9/1995 | Webb |
| 5,482,564 | A | | 1/1996 | Douglas et al. |
| 5,512,374 | A | | 4/1996 | Wallace et al. |
| 5,523,878 | A | | 6/1996 | Wallace et al. |
| 5,576,878 | A | | 11/1996 | Henck |
| 5,602,671 | A | | 2/1997 | Hornbeck |
| 5,610,438 | A | | 3/1997 | Wallace et al. |
| 5,694,740 | A | | 12/1997 | Martin et al. |
| 5,771,116 | A | | 6/1998 | Miller et al. |
| 5,852,502 | A | * | 12/1998 | Beckett ............... 358/512 |
| 5,936,758 | A | | 8/1999 | Fisher et al. |

(Continued)

OTHER PUBLICATIONS

International Search Report. Feb. 15, 2008.

(Continued)

*Primary Examiner* — Georgia Y Epps
*Assistant Examiner* — Sultan Chowdhury
(74) *Attorney, Agent, or Firm* — Patterson & Sheridan, LLP (57) ABSTRACT

A high-resolution image is generated using multiple spatially offset lower-resolution digital micro-mirror device (DMD) panels. Multiple lower-resolution subframe signals for controlling the spatial light modulators are generated from a high-resolution image signal using a resolution reduction and interpolation algorithm. The spatial light modulators under control of the subframe signals are illuminated by a light source and light beams reflected from the spatial light modulators are combined and directed onto a screen for display.

19 Claims, 8 Drawing Sheets

U.S. PATENT DOCUMENTS

| | | | |
|---|---|---|---|
| 5,939,785 A | 8/1999 | Klonis et al. | |
| 5,961,732 A | 10/1999 | Patrin et al. | |
| 6,004,912 A | 12/1999 | Gudeman | |
| 6,024,801 A | 2/2000 | Wallace et al. | |
| 6,036,786 A | 3/2000 | Becker et al. | |
| 6,300,294 B1 | 10/2001 | Robbins et al. | |
| 6,365,229 B1 | 4/2002 | Robbins | |
| 6,475,570 B2 | 11/2002 | Jacobs | |
| 6,618,520 B2 | 9/2003 | Tew | |
| 6,674,140 B2 | 1/2004 | Martin | |
| 6,704,131 B2 | 3/2004 | Liu | |
| 6,709,948 B2 | 3/2004 | Dewa et al. | |
| 6,733,683 B2 | 5/2004 | Dewa | |
| 6,746,886 B2 | 6/2004 | Duncan et al. | |
| 6,764,875 B2 | 7/2004 | Shook | |
| 6,806,993 B1 | 10/2004 | Adams et al. | |
| 6,841,079 B2 | 1/2005 | Dunbar et al. | |
| 6,843,936 B1 | 1/2005 | Jacobs | |
| 6,891,657 B2 | 5/2005 | Hewlett et al. | |
| 6,921,680 B2 | 7/2005 | Robbins | |
| 6,930,367 B2 | 8/2005 | Lutz et al. | |
| 6,946,728 B2 | 9/2005 | Chen et al. | |
| 6,956,283 B1 | 10/2005 | Peterson | |
| 6,963,319 B2 * | 11/2005 | Pate et al. | 345/30 |
| 7,136,210 B2 * | 11/2006 | Harper | 359/237 |
| 7,407,295 B2 * | 8/2008 | Damera-Venkata et al. | 353/94 |
| 7,470,032 B2 * | 12/2008 | Damera-Venkata et al. | 353/94 |
| 7,604,357 B2 * | 10/2009 | May et al. | 353/85 |
| 2002/0057253 A1 * | 5/2002 | Lim et al. | 345/102 |
| 2003/0002019 A1 | 1/2003 | Miller | |
| 2004/0136044 A1 | 7/2004 | Miller et al. | |
| 2004/0145795 A1 | 7/2004 | Pan et al. | |
| 2004/0145822 A1 | 7/2004 | Pan et al. | |
| 2004/0159631 A1 | 8/2004 | Pan et al. | |
| 2004/0169190 A1 | 9/2004 | Ueno et al. | |
| 2004/0239885 A1 * | 12/2004 | Jaynes et al. | 353/30 |
| 2004/0240033 A1 | 12/2004 | Pan et al. | |
| 2005/0101059 A1 | 5/2005 | Yang | |
| 2005/0104144 A1 | 5/2005 | Yang et al. | |
| 2005/0121166 A1 | 6/2005 | Dubay | |
| 2005/0157375 A1 | 7/2005 | Doan et al. | |
| 2005/0174628 A1 | 8/2005 | Kelly et al. | |
| 2005/0212067 A1 | 9/2005 | Duboc et al. | |
| 2006/0221304 A1 * | 10/2006 | Damera-Venkata et al. | 353/30 |
| 2007/0097017 A1 * | 5/2007 | Widdowson et al. | 345/1.3 |
| 2007/0146638 A1 * | 6/2007 | Ma et al. | 353/20 |

OTHER PUBLICATIONS

Chen, et al. "Vapor Phase Anti-Stiction for MEMS and NMES Devices" A GOALI Proposal submitted to Division of Civil and Mechanical Systems Solid Mechanics and Materials Engineering (SMME). Dec. 1, 2003.

Kobrin, et al. "Molecular Vapor Deposition—An Improved Vapor-Phase Deposition Technique of Molecular Coatings for MEMS Devices" Semiconductor Equipment and Materials International, 2004.

"Sulphur Hexafluoride" Solvay Fluor publication. www.solvay-fluor.com. 1996-2001.

* cited by examiner

SPATIALLY OFFSET MULTI-IMAGER-PANEL ARCHITECTURE FOR PROJECTING AN IMAGE

CROSS-REFERENCE TO RELATED APPLICATIONS

This application claims the benefit of U.S. Provisional Patent Application No. 60/851,105, entitled "Spatially Offset Multi-Panel Architecture for High Resolution Projection Displays," filed on Oct. 11, 2006.

BACKGROUND OF THE INVENTION

1. Field of the Invention

Embodiments of the present invention relate generally to display systems, and, more particularly, to a system and method for projection display of an image.

2. Description of the Related Art

Digital projection is used in televisions, projectors and video projectors. In digital projectors, a projected image is created by illuminating a spatial light modulator, such as a liquid-crystal-on-silicon (LCOS), a high-temperature polysilicon transmissive panel (HTPS) a deformable micro-mirror device (DMD), or other microelectromechanical system (MEMS) device. A deformable micro-mirror device is an array of small mirrors arranged in a typically rectangular matrix on a semiconductor chip, known as a DMD chip, or DMD panel. Each mirror represents one pixel in the projected image, and therefore the resolution of the projected image corresponds to the number of micro-mirrors contained in the DMD panel. These mirrors are repositioned rapidly to reflect light either through projection optics for viewing, or to a light dump. Rapidly toggling a mirror between these two orientations, i.e., "on" and "off", produces gray scales for one of the pixels, where the brightness of the gray scale is controlled by the ratio of on time to off time. To display color images, the mirrors of the DMD panel are positioned for each primary color as required in rapid succession. The changes in mirror position for each primary color are synchronized with a multi-color light source, and variation in intensity of each primary color at an image pixel is controlled by rapidly toggling the mirror corresponding to the pixel between the on and off orientations.

A significant cost of digital projection systems is the spatial light modulator, such as a DMD panel. For higher-resolution digital projection systems, which require more pixels to provide a higher-resolution image, spatial light modulator cost is a limiting factor in the cost-effective production of such systems. This is because the cost of a spatial light modulator increases non-linearly as the resolution of the spatial light modulator is increased.

One approach in the art for creating a high-resolution display is known as wobulation. Wobulation increases the resolution of a digital projection system without a corresponding increase resolution of the system spatial light modulator. Wobulation accomplishes this by sequentially overlaying two or more lower-resolution images to effectively produce an image with a higher-resolution. In this approach, the image data making up a high-resolution image are essentially divided into multiple lower-resolution images, or subframes, which are displayed in rapid succession to appear to the human eye as if projected simultaneously and superimposed. When displayed for viewing, each subframe is displaced from the other subframes making up the original image by a fraction of a pixel, e.g., one-half pixel width. To the human eye the subframes appear to be superimposed on each other, so the optical information contained in the multiple subframes is effectively combined to produce a close facsimile of the original high-resolution image. Because each subframe is by itself a low-resolution image, and because each subframe is generated by the same spatial light modulator, wobulation allows a digital projection system to emulate the spatial resolution of a higher-resolution display device at a reduced cost. A more detailed description of wobulation may be found in U.S. Pat. Nos. 7,030,894 and 7,034,811.

The displacement of the subframes that allows wobulation of a high-resolution image is generally accomplished by physically shifting the optical path for each subframe by the desired amount, i.e., a fraction of the width of one pixel. In some projection systems that use wobulation in conjunction with a DMD panel, a prism is positioned between the DMD panel and projection lens of a digital projection system, and is mechanically translated to a unique position for the projection of each subframe. In this way, each subframe is projected along a slightly different optical path, resulting in each subframe being offset from each other subframe and producing a wobulated image that approximates the resolution of the original. In other systems, the optical path of each subframe is altered by translating the DMD panel. In either case, wobulation relies on the precise mechanical displacement of a digital projection system component that takes place at very high speed, and such high-speed mechanical displacement is subject to drift, misalignment, non-linear behavior, and other issues that can affect image quality.

In addition, a digital projection system using wobulation requires control electronics and image processing drivers having substantially greater bandwidth than a digital system displaying the same resolution image without the use of wobulation. The greater bandwidth is required since wobulation produces two complete images for a single image frame and therefore must rely on image oversampling, i.e., the generation of images at twice the normal frequency of a non-wobulated digital display system.

Accordingly, there is a need in the art for methods and apparatus for displaying an image that increases the effective resolution of a display device without relying on high-speed mechanical displacement of optical components or a higher bandwidth spatial light modulator.

SUMMARY OF THE INVENTION

Embodiments of the present invention provide devices and methods for providing a high-resolution image using multiple spatially offset lower-resolution spatial light modulator panels.

A method of displaying an image, according to an embodiment of the invention, comprises receiving a digital image signal having a first resolution, creating a first and a second subframe image from the digital image signal, wherein each of the first and second subframe images have a second resolution, and projecting the first subframe image and the second subframe image substantially simultaneously onto a focal plane, wherein the second subframe image is spatially offset from the first subframe image by an offset distance.

A method of displaying an image, according to another embodiment of the invention, comprises receiving a digital image signal having a first resolution, creating a first and a second subframe image from the digital image signal, wherein each of the first and second subframe images have a second resolution, and projecting the first subframe image and the second subframe image substantially simultaneously onto a focal plane, wherein the second subframe image is spatially offset from the first subframe image by an offset distance and the first subframe image and the second subframe image do not substantially overlap.

According to another embodiment of the invention, a system for displaying an image comprises an image processing unit adapted to define a first subframe signal and a second subframe signal from a digital image source and to transmit the first subframe signal to a first imager assembly and the second subframe signal to a second imager assembly, a first imager assembly configured to convert a first subframe signal to a first subframe image that is delivered to a focal plane, and a second imager assembly configured to convert a second subframe signal to a second subframe image that is delivered to the focal plane substantially simultaneously with the first subframe, wherein the second subframe image is offset from the first subframe image by an offset distance.

According to another embodiment of the invention, a system for generating an image from digital image signals for display on a screen comprises an illumination system for generating a light beam, a processing unit configured to receive the digital image signals and programmed to generate at least first and second control signals from the digital image signals, a first spatial light modulator that operates under control of the first control signals generated by the processing unit and reflects a portion of the light beam towards a screen for display, and a second spatial light modulator that operates under control of the second control signals generated by the processing unit and reflects a portion of the light towards a screen for display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate methods and apparatus for providing a high-resolution image using multiple spatially offset lower-resolution spatial light modulators, such as DMD, LCOS, or HTPS. Multiple lower-resolution signals, or subframe signals, are generated from a high-resolution image signal using a resolution reduction and interpolation algorithm. The resolution reduction and interpolation algorithm defines each subframe signal from the high-resolution image signal so that the pixels of each subframe signal are spatially offset from the pixels of the other subframes a desired offset distance. In one embodiment, a digital overlay approach is used, in which the offset distance is equal to a fraction of the width of a single pixel. In another embodiment, an in-engine tiling approach is used, in which the offset distance is equal to a fraction of the width of the entire image so that the subframe images are positioned side-by-side.

In the overlay approach, the resulting composite of the subframe images, when optically superimposed with the appropriate offset, substantially reproduces the original high-resolution image. Each subframe image is produced and directed by a lower-resolution spatial light modulator, and is projected to be spatially offset from the other subframe images to physically reproduce the offset assumed in an interpolation algorithm. In this way, multiple lower-resolution spatial light modulators can effectively provide the same image resolution as one higher-resolution spatial light modulator. In addition, the need for complicated optical component displacement schemes used in conventional devices is unnecessary to produce the high-resolution image.

In the in-engine tiling approach, the lower-resolution subframe images are projected adjacent to each other to form a resulting composite image having the same resolution as the high-resolution image signal. Unlike conventional tiling schemes, in which a high-resolution image signal is split between multiple optical engines, in-engine tiling uses a single optical engine containing multiple lower-resolution spatial light modulators. A significant drawback of conventional multi-engine tiling schemes is the need to calibrate multiple light sources that together produce the projected image. Since a single optical engine containing a single light source is used in this embodiment, calibration of the intensity and color spectrum of multiple light sources is unnecessary.

Figure 1:
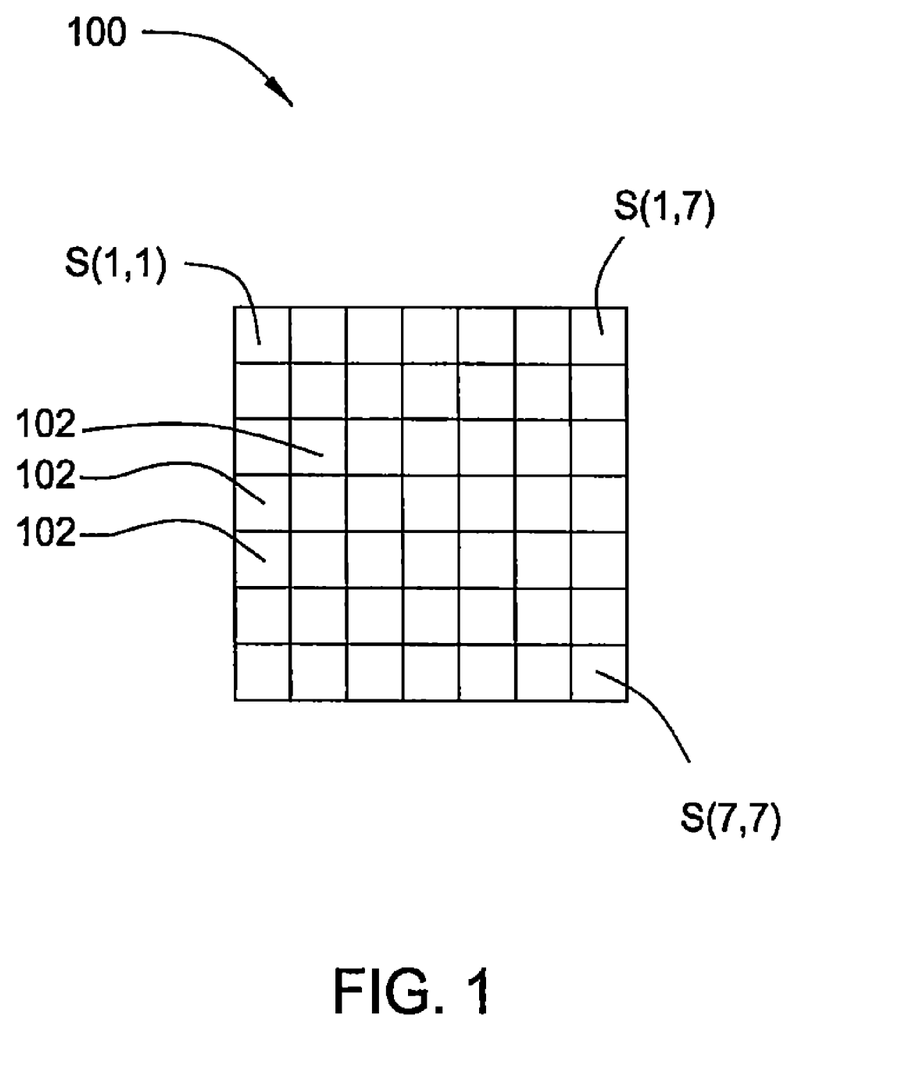
FIG. 1 is a schematic illustration of a high-resolution image source.
Figure 2:
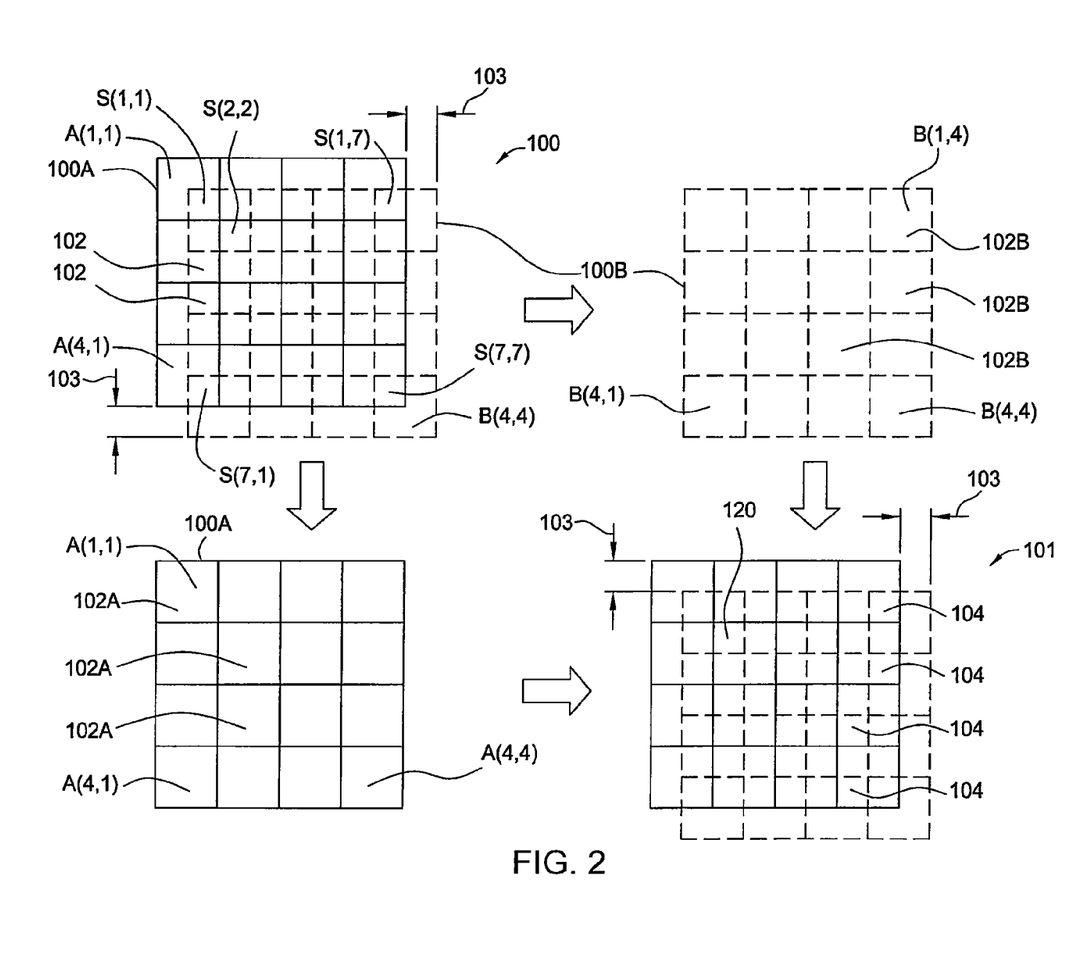
FIG. 2 schematically illustrate a method by which the optical data contained in an image source is converted to two subframe signals, according to an embodiment of the invention.

FIGS. 1 and 2 schematically illustrate a method, according to one embodiment of the invention, by which the optical data contained in an image source 100 is converted to two subframe signals, and the subframe signals are optically superimposed using an overlay method to produce a displayed image having the same spatial resolution as image source 100. FIG. 1 is a schematic illustration of image source 100. Image source 100 is a digital image source, such as a single frame of a digital video, and includes the digital image data necessary to generate a digital, high-resolution image. Image source 100 is made up of a plurality of picture elements, or pixels 102, each of which is represented by a sub-square contained in image source 100, as shown. Each pixel 102 represents a single point in the high-resolution image signal contained in image source 100, and expresses the intensity of the image at a particular point in the image source. For color display systems, each picture frame consists of three or four primary color frames, e.g., red, green, blue, and white, or cyan, magenta, yellow, and black. The image source 100 then represents one such primary color frame. Image source 100 has m columns and n rows, and each pixel location is identified as S(n,m), in FIG. 1, where n=1, 2, 3, . . . , 7 and m=1, 2, 3, . . . , 7.

FIG. 2 schematically illustrates an image source 100, two subframe signals 100A and 100B generated from the image data contained in image source 100, and a displayed image 101 that is formed when subframe signals 100A and 100B are optically superimposed as described herein. Image source 100 and the plurality of pixels 102 contained therein are depicted with subframe signals 100A and 100B superimposed thereon to illustrate the relative positions of image source 100 and subframe signals 100A and 100B.

Subframe signals 100A, 100B are digital representations of lower-resolution images and are generated digitally from image source 100 using a resolution reduction and interpolation algorithm. In this embodiment, subframe signals 100A, 100B are each composed of one fourth as many pixels 102A, 102B, respectively, as image source 100, and therefore have half the vertical and half the horizontal resolution of image source 100. In other embodiments, subframe signals 100A, 100B may only have lower-resolution than image source 100 along one axis thereof, e.g., horizontally, and may have the same resolution as image source 100 along the other axis thereof, e.g., vertically. Each pixel 102A of subframe signal 100A represents four times the surface area of image source 100 as each pixel 102, therefore the spatial resolution of subframe signal 100A is one fourth that of image source 100. Similarly, each pixel 102B of subframe signal 100B represents four times the surface area of image source 100 as each pixel 102, and therefore the spatial resolution of subframe signal 100B is also one fourth that of image source 100. Each pixel location of subframe signal 100A is identified as A(n,m) in FIG. 1, where n=1, 2, 3, 4 and m=1, 2, 3, 4. Each pixel location of subframe signal 100B is identified as B(n,m) in FIG. 1, where n=1, 2, 3, 4 and m=1, 2, 3, 4.

Pixels 102B of subframe signal 100B are offset by an offset distance 103 relative to pixels 102A of subframe signal 100A. In this embodiment, pixels 102B of subframe signal 100B are offset both vertically and horizontally, and offset distance 103 is one-half the width of a lower-resolution pixel, i.e., pixel 102A or 102B. It is also contemplated that offset distance 103 may be other distances less than the width of pixel 102A or 102B, e.g. one third the pixel width, and that pixels 102B of subframe signal 100B may only be offset from the pixels 102A of subframe signal 100A either vertically or horizontally.

Algorithms for reducing image resolution from a digital image source are commonly known and used in the art. Such algorithms mathematically define the value of each optical characteristic of each pixel in the lower-resolution image signal, e.g., intensity of each color, based on the value of the optical characteristics of multiple adjacent pixels in the higher-resolution image signal. In the embodiment illustrated in FIG. 2, the lower-resolution image signals are subframe signals 100A, 100B, and the higher-resolution image signal is image source 100. One such algorithm is the four-point interpolation algorithm, described below in conjunction with Equations (1) and (2) and FIG. 2. Because image source 100 is a digital image source, i.e., a matrix of numerical values representing the optical characteristics of an image at each point, image source 100 is well-suited for mathematical treatment by such a resolution reduction algorithm and no analog-to-digital conversion is required.

Equations (1) and (2) describe one resolution reduction and interpolation algorithm that may be used by embodiments of the invention to generate the intensity of each primary color for each pixel of subframe signals 100A, 100B from image source 100.

$$A(n,m)=S(2n,2m)/2+S(2n-1,2m)/8+S(2n+1,2m)/8+S(2n,2m-1)/8+S(2n,2m+1)/8 \quad (1)$$

$$B(n,m)=S(2n+1,2m+1)/2+S(2n,2m+1)/8+S(2n+2,2m+1)/8+S(2n+1,2m)/8+S(2n+1,2m+2)/8 \quad (2)$$

Equations (1) and (2) can be applied to all pixels except the first and last row or column, for which different weighting factors can be used accordingly.

Displayed image 101 represents a high-resolution image displayed on-screen that is produced by substantially simultaneously projecting a first subframe image based on subframe signal 100A and a second subframe image based on subframe signal 100B together as shown. As used herein, the term "projecting two subframe images substantially simultaneously" is defined as projecting at least one primary color component of a first subframe image on a focal plane and at least one primary color component of a second subframe image on the focal plane at substantially the same time, i.e., a substantial temporal overlap exists during the time required to display the first subframe image and the second subframe image on the focal plane. The first subframe image is projected from a first low-resolution spatial light modulator panel and the second subframe image is projected from a second low-resolution spatial light modulator panel, where the pixels 102B of subframe signal 100B are offset horizontally and vertically by offset distance 103 relative to the pixels 102A of subframe 100A. In this way, a plurality of subpixels 104 are formed, where each subpixel 104 in displayed image 101 displays substantially the same optical information as a corresponding single pixel 102 contained in image source 100. This is because the first and second subframe images are projected on-screen with the same offset distance 103 used by the algorithm that generated subframe signal 100A and subframe signal 100B from image source 100. For example, subpixel 120 in displayed image 101 effectively displays the same optical information as pixel S(2,2) in image source 100. Hence, displayed image 101 is effectively a projected image having the same spatial resolution as image source 100, even though a spatial light modulator panel having the same resolution as image source 100 is not used to produce displayed image 101. Due to the disproportionately high cost of high-resolution spatial light modulator panels, a digital projection system configured with two or more lower-resolution spatial light modulator panels as described herein may be substantially lower in cost compared to a digital projection system configured with a single higher-resolution spatial light modulator panel.

Figure 3:
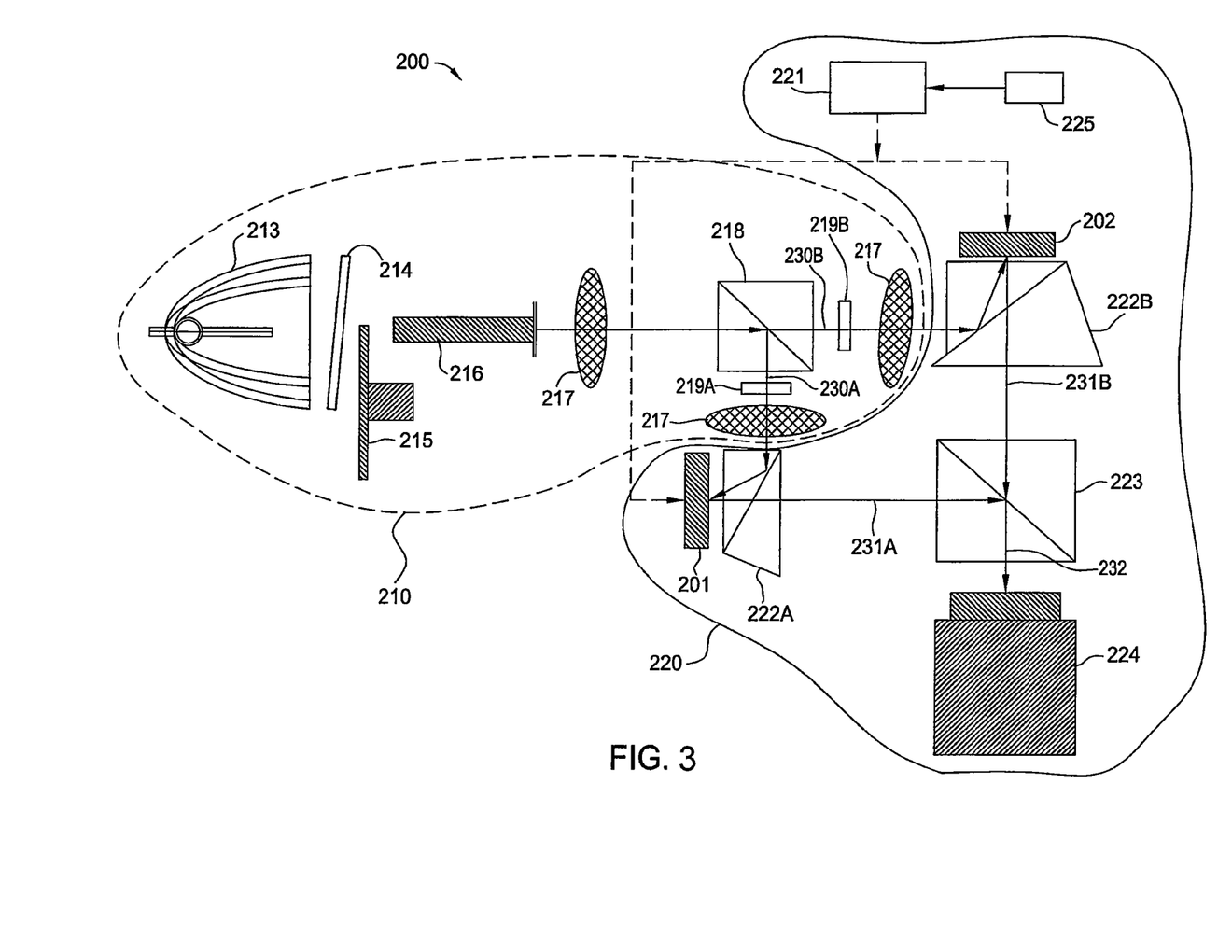
FIG. 3 schematically illustrates a digital projection system, according to an embodiment of the invention.

FIG. 3 schematically illustrates a digital projection system 200, according to an embodiment of the invention. Digital projection system 200 is an optical engine having two DMD panels 201, 202, and is configured to display a color image with twice the horizontal and vertical spatial resolution as DMD panels 201, 202 taken individually. An optical engine is an optical mechanical device that projects an image generated by a spatial light modulator onto a screen at a distance forming an enlarged image that is on the order of 100-1000 times larger than the light modulator. In other embodiments, optical engines are contemplated that are similar to digital projection system 200 in organization and operation, but are configured to display an image with higher-resolution than the resolution of the DMD panels along only one axis of the image. For example, a digital projection system may be configured to display an image with the same vertical resolution and effectively twice the horizontal resolution of the DMD panels contained in the system.

Digital projection system 200 includes an illumination assembly 210 and a display assembly 220. Illumination assembly 210 is configured to provide display assembly 220 with the requisite light source primary colors, e.g., red, green and blue, in a synchronized fashion to produce a color image. Display assembly 220 generates two subframes of a high-resolution input image and distributes them to DMD panels 201, 202, which modulate the incoming light of a color provided by illumination assembly 210. Display assembly 220 then projects the two subframes substantially simultaneously onto a focal plane FP to produce and display a color image having the same effective resolution as the high-resolution input image.

Illumination assembly 210 includes a light source 213 and an optical filter 214 positioned to condition the output of light source 213. Illumination assembly 210 further includes a color wheel 215, a light tunnel 216, and a beam-splitting optic 218 optically aligned with the output of optical filter 214, polarizers (optional) 219A, 219B, and a plurality of alignment optics 217 positioned as shown. Light source 213 is a high-power light source, such as an ultra-high pressure (UHP) mercury lamp with an elliptical reflector, and is selected to provide the necessary illumination for digital projection system 200 to project an image as desired. Optical filter 214 conditions the optical output of light source 213 by filtering unwanted UV and IR wavelength light.

Color wheel 215 includes multiple, semi-transparent sectors of different colors, where the sector colors make up a color scheme that provides primary colors for producing a color image, e.g., red, green and blue, or cyan, magenta and yellow. Light incident on color wheel 215 from light source 213 passes through a single sector at any given time, and color wheel 215 rotates, so that light of each primary color of color wheel 215 is sequentially directed to display assembly 220. The rotation of color wheel 215 is synchronized with the operation of DMD panels 201, 202 in display assembly 220 so that display assembly 220 can generate a high-resolution color image.

Light tunnel 216 ensures that light intensity is uniform across the entire area of the DMD. Alignment optics 217, e.g., lenses and/or mirrors, are positioned to direct and focus light entering and leaving beam-splitting optic 218 as required. Beam-splitting optic 218 receives light from light wheel 215 and light tunnel 216, and directs half of the incident light along a first optical path 230A and half of the incident light along a second optical path 230B. In one embodiment, beam splitting optic 218 is a polarizing beam splitter, and is configured to direct light of one polarization state, e.g., s-polarized, along first optical path 230A and light of another polarization state, e.g., p-polarized, along second optical path 230B. In another embodiment, beam-splitting optic 218 is a non-polarizing beam splitter, such as a half-silvered mirror or a beam splitter cube. In the embodiment illustrated in FIG. 3, beam-splitting optic 218 is a non-polarizing beam splitter, and polarizers 219A, 219B are optically coupled thereto in order to condition the polarization state of light directed along first optical path 230A and second optical path 230B.

In an alternative embodiment of illumination assembly 210, a laser or LED-illuminated projection system may be used to provide display assembly 220 with the requisite primary colors in a synchronized fashion to display a color image. For example, light source 213, optical filter 214, color wheel 215, and light tunnel 216 may be replaced with multiple laser or LED-based light sources, where each laser or LED-based light source produces a wavelength of light corresponding to one of the constituent primary colors making up the input signal, i.e., input image data 225.

Display assembly 220 includes an image processing unit 221, DMD panels 201, 202 electronically coupled to image processing unit 221, prism assemblies 222A, 222B, a beam-combining optic 223, and projection optics 224. Image processing unit 221 is adapted to receive input image data 225, which is an electronic signal that includes one or more digital image frames, such as the frames of a digital video. Each frame of input image data 225 represents a high-resolution image, for example a color image compatible with the SVGA format source, i.e., having a pixel resolution of 1600 pixels× 1200 pixels. Image processing unit 221 is further adapted to generate first and second subframe signals using a resolution reduction and interpolation algorithm, as described above in conjunction with FIG. 1, and transmit the first and second subframe signals to DMD panel 201 and DMD panel 202, respectively. The first and second subframe signals are taken from a single high-resolution frame of input image data 225, and contain substantially all optical data necessary to reconstruct that source frame.

In another embodiment, each frame of input image data 225 has a 1080p resolution of 1920 pixels×1080 pixels, DMD panels 201 and 202 are each configured with a XGA resolution of 1024 pixels×768 pixels. The superimposed frame of the two DMD subframes therefore yield a 2048 pixel×1536 pixel image, which is sufficient to cover the 1080p format source. In other embodiments, the first and second subframe signals and DMD panels 201, 202 may only have reduced resolution compared to a frame of input image data 225 along either the horizontal or the vertical axis.

Thus, the lower-resolution spatial light modulators, i.e., DMD panels 201, 202, can produce an image having substantially the same resolution as a higher-resolution format source. For example, two VGA-formatted spatial light modulators, i.e., imagers having a pixel resolution of 640×480 and an aspect ratio of 4:3, can be used to produce an image having a resolution substantially similar to XGA formatting, i.e., having a pixel resolution of 1024×768 and an aspect ratio of 4:3. Similarly, two SVGA-formatted spatial light modulators, i.e., imagers having a pixel resolution of 800×600 and an aspect ratio of 4:3, can be used to produce an image having a resolution substantially similar to UXGA formatting, i.e., having a pixel resolution of 1600×1200 and an aspect ratio of 4:3. Further, two XGA-formatted spatial light modulators, i.e., imagers having a pixel resolution of 1024×768 and an aspect ratio of 4:3, can be used to produce an image having a resolution substantially similar to 1080p formatting, i.e., having a pixel resolution of 1920×1080 and an aspect ratio of 16:9. One skilled in the art will recognize that any excess pixels along the boarders of a subframe can be filled to be black pixels as desired to accommodate a given image format. The examples described herein are for illustrative purposes and in no way limit the scope of the invention, and other combinations of lower-resolution spatial light modulators are also contemplated.

Prism assemblies 222A, 222B are positioned in optical paths 230A, 230B, respectively, and are configured to direct light from beam-splitting optic 218 to DMD panels 201, 202, respectively. In the embodiment illustrated in FIG. 3, prism assemblies 222A, 222B utilize total internal reflection (TIR) to direct light to and from DMD panels 201, 202, respectively, however configurations that use other optical devices to direct light to and from DMD panels 201, 202 also fall within the scope of the invention.

Beam-combining optic 223 is an optics assembly positioned between prism assemblies 222A, 222B and projection optics 224, and is configured to combine a light beam 231A directed from DMD panel 201 and a light beam 231B from DMD panel 202 into a single light beam 232. Beam-combining optic 223 is also configured to direct single light beam 232 onto a focal plane of projection optics 224. Beam-combining optic 223 may be a birefringent optic or an assembly of lenses and/or prisms. Projection optics 224 is a single lens or a lens assembly, and is configured to project a combined image (not shown) for viewing. This combined image consists of a subframe image generated by DMD panel 201 and a subframe image generated by DMD panel 202, where the subframe images are spatially offset by one-half pixel width to produce a combined image having an effective resolution equal to the resolution of a frame of input image data 225. The spatial offset between the subframe images generated by DMD panels 201 and 202 may be established by optically altering the path along which one subframe image is directed or by physically displacing either DMD panel 201 or 202. In the embodiment illustrated in FIG. 3, the spatial offset between the subframe images generated by DMD panels 201 and 202 is produced by positioning DMD panel 201 so that light beam 231A does not precisely intersect and combine with light beam 231B in beam-combining optic 223 and instead is displaced relative to light beam 231B by the desired offset distance. In one embodiment, an optical engine similar in organization and operation to digital projection system 200, i.e., a display engine based on a multiple spatial light modulator, spatially offset architecture, is used to display an image using an in-engine tiling approach. In contrast to digital projection system 200, in this embodiment the offset distance between the subframe images displayed by each spatial light modulator is not a portion of a pixel width. Instead, the subframe offset distance is substantially equal to the width of a spatial light modulator, e.g., a DMD panel, thereby allowing the subframe images to be displayed side-by-side. In this way, a high spatial resolution image can be displayed using multiple lower spatial resolution spatial light modulators, with substantially no loss in effective spatial resolution. As used herein, "in-engine tiling" of two or more subframe images is defined as projecting the two or more subframe images substantially adjacent to each other onto a focal plane to appear as a single image, where projection of the two or more subframes is performed by a single optical engine. It is contemplated that a portion of each subframe image, e.g., one or more rows or columns of pixels, may overlap a portion of an adjacent subframe to more smoothly combine the subframe images into a single projected image. In one embodiment, as much as 10% of the surface area of a subframe may overlap another subframe.

Figure 4:
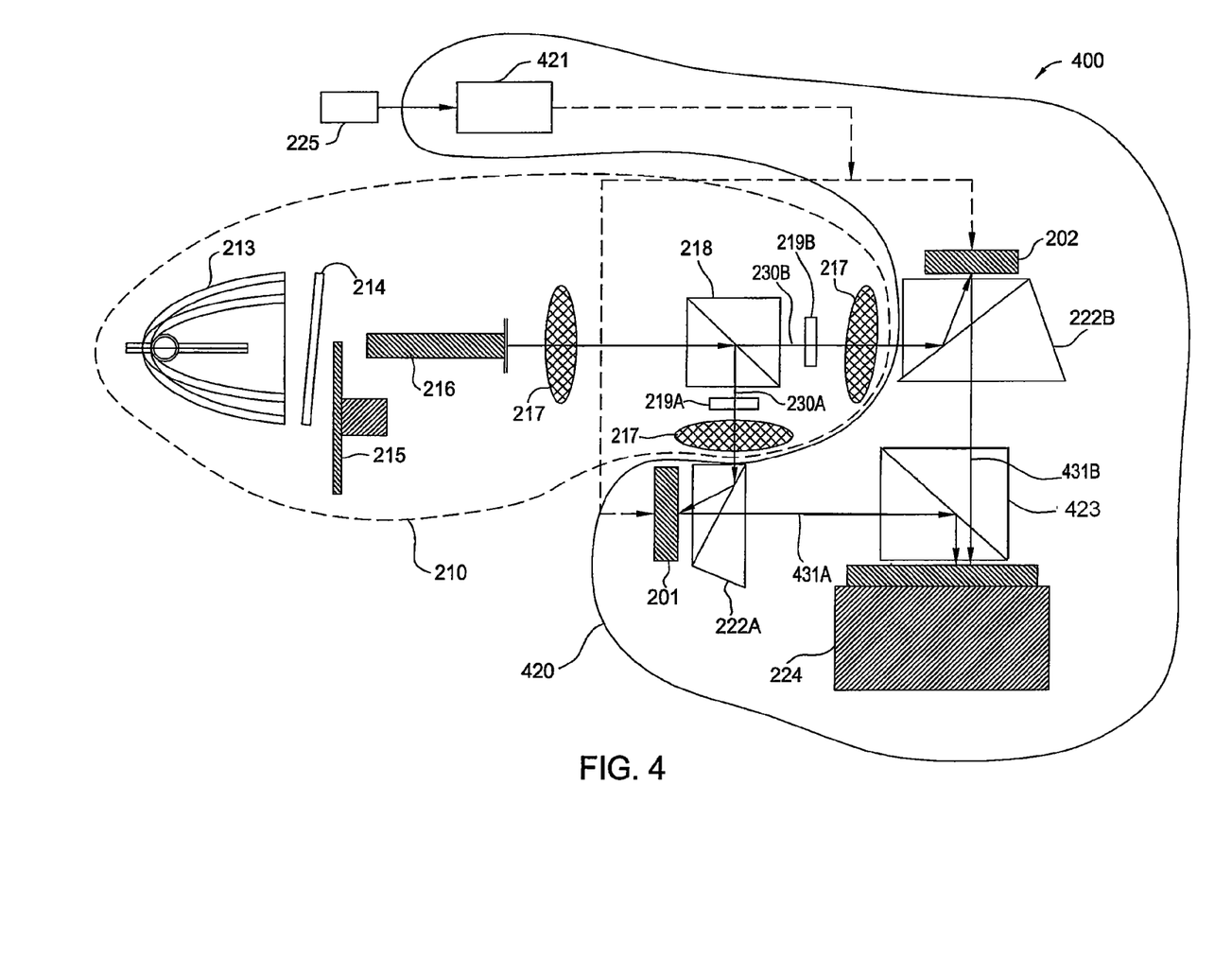
FIG. 4 illustrates a digital projection system configured to display a high spatial resolution image using in-engine tiling of two lower-resolution DMD panels, according to an embodiment of the invention.

FIG. 4 illustrates a digital projection system 400 configured to display a high spatial resolution image using in-engine tiling of two lower-resolution images, according to an embodiment of the invention. Digital projection system 400 shares a number of identical elements with digital projection system 200, and identical reference numbers have been used, where applicable, to designate identical elements that are common between digital projection system 200 and digital projection system 400.

Digital projection system 400 includes an illumination assembly 210 and a display assembly 420. Illumination assembly 210 is described above in conjunction with FIG. 3. Display assembly 420 is substantially similar to display assembly 220 of digital projection system 200 with the following exceptions: image processing unit 221 is replaced by image processing unit 421, and beam-combining optic 223 is replaced by beam-combining optic 423.

Similar to image processing unit 221, image processing unit 421 is adapted to receive input image data 225, generate first and second subframe signals using input image data 225, and transmit the first and second subframe signals to DMD panel 201 and DMD panel 202, respectively. Unlike image processing unit 221, image-processing unit 421 does not generate the first and second subframe signals using a resolution reduction and interpolation algorithm. Rather, image-processing unit 421 spatially divides a high-resolution color image signal into two smaller subframe signals, as illustrated in FIG. 5A.

Figure 5A:
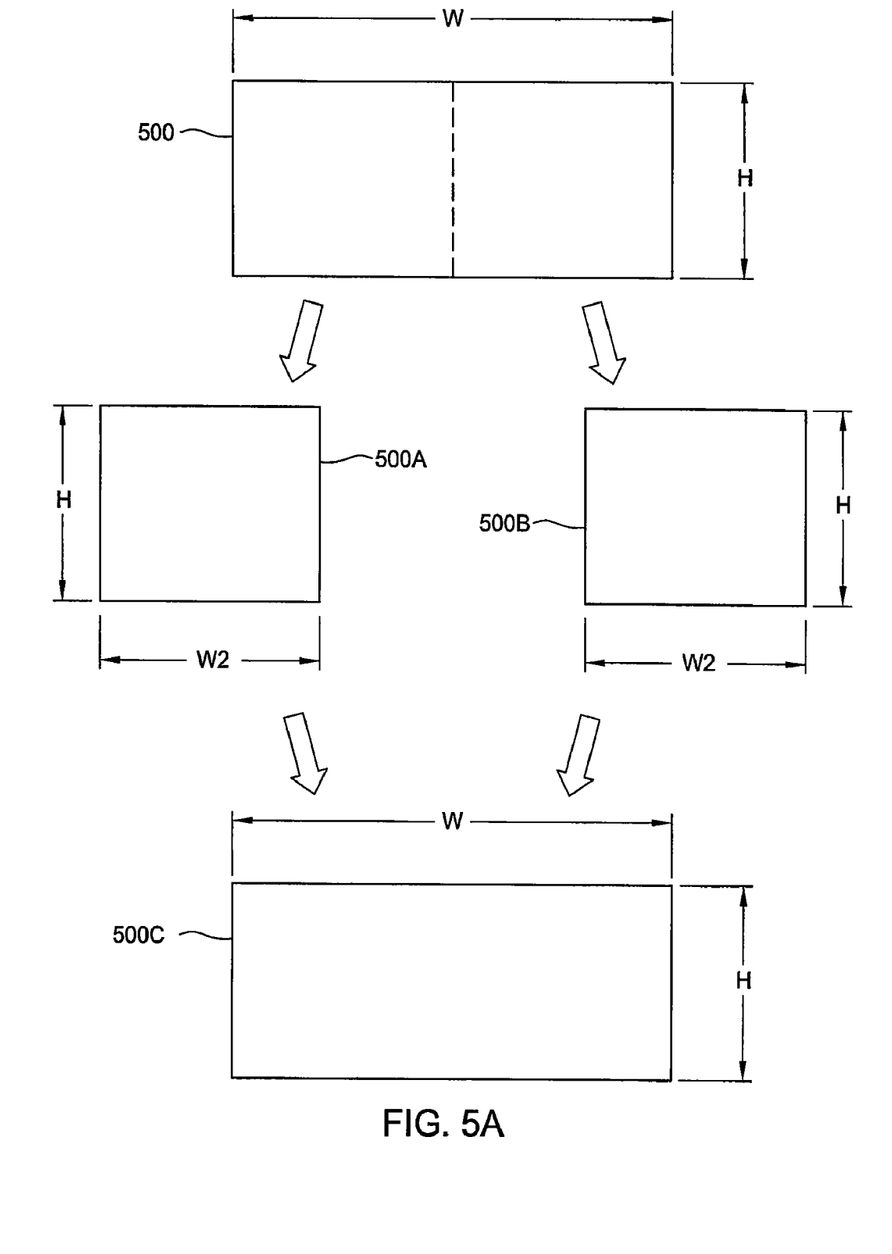
FIG. 5A is a schematic representation of an original image frame and two subframe signals, according to an embodiment of the invention.
Figure 5B:
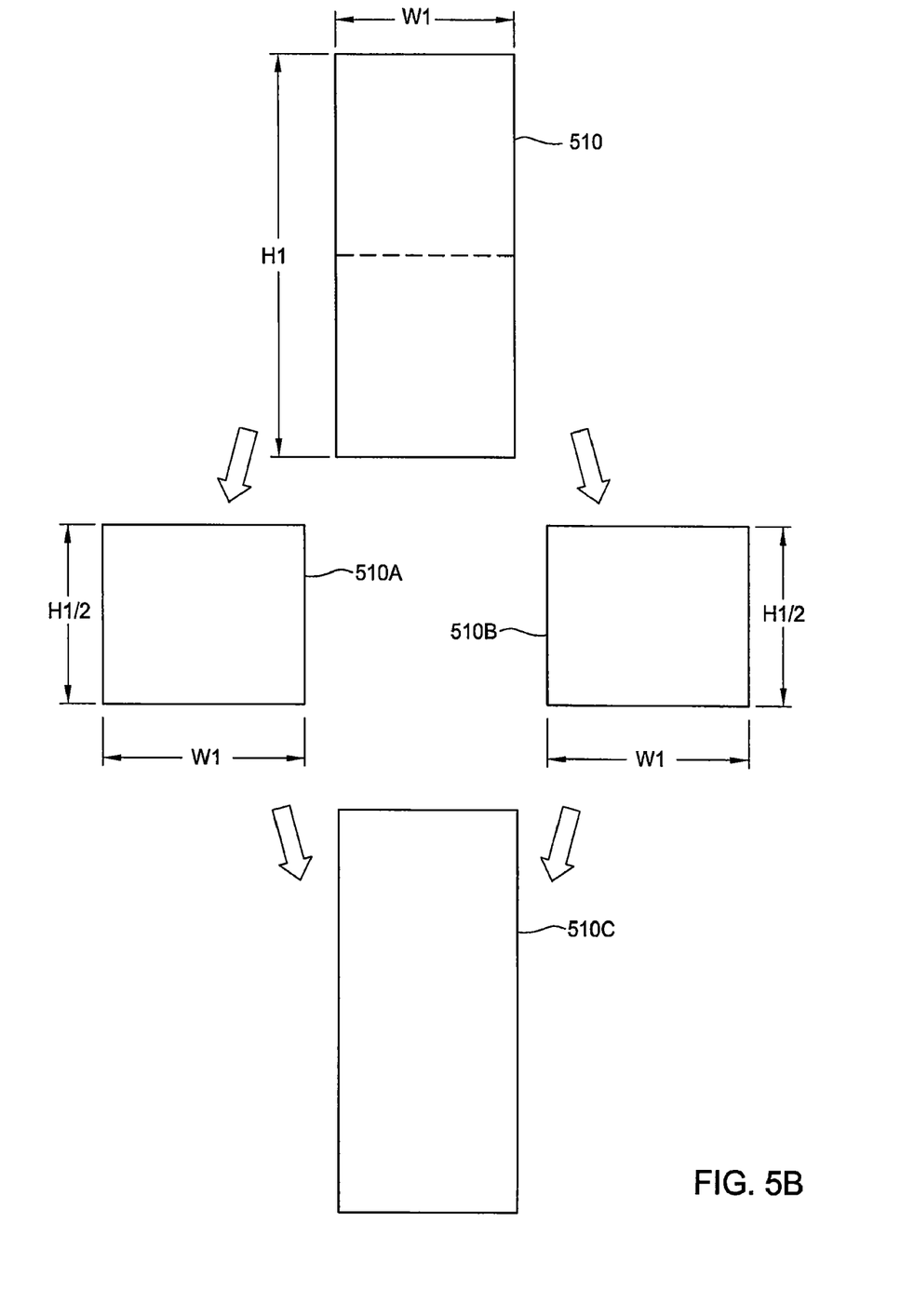
FIG. 5B schematic illustrates an original image frame divided into two vertically stacked subframe signals, according to an embodiment of the invention.

FIG. 5A is a schematic representation of an original image frame 500, subframe signals 500A, 500B, and projected image frame 500C. Original image frame 500 is a high-resolution color image frame contained in input image data 225 and received by image processing unit 421. Original image frame 500 has a pixel height H and a pixel width W. For example, a tiled high spatial resolution image has H equal to 600 pixels and W equal to 1600 pixels. Image processing unit 421 divides original image frame 500 into subframe signals 500A and 500B, where each subframe signal has a height H and a width W2. As shown, width W2 is equal to one half of width W. For example, when original image frame 500 is in an 600×1600 pixel format, W2 is equal to 800 pixels. When subframe signals 500A, 500B are projected adjacent each other as described herein, projected image frame 500C is generated having pixel height H and pixel width W, as shown. Alternatively, an original image frame 510 having a pixel height H1 and pixel width W1 may be divided into two vertically stacked subframe signals 510A and 510B, as illustrated in FIG. 5B. Subframe signals 510A and 510B each have a pixel height equal to one half of H1 and a pixel width equal to W1. Hence, when vertical in-engine tiling is used to project subframe signals 510A and 510B adjacent each other, projected image frame 500C is generated having pixel height H and pixel width W, as shown.

Referring to FIG. 4, beam-combining optic 423 is a lens, prism, mirror, or other optics assembly positioned between prism assemblies 222A and projection optics 224, and is configured to direct a light beam 431A from DMD panel 201 to projection optics 224 and light beam 431B from DMD panel 202 to projection optics 224. Projection optics 224 is aligned with beam-combining optic 423 and prism assembly 222B so that projection optics 224 displays the subframe image contained in light beams 431A and 431B as effectively a single displayed image. The resultant displayed image appears to be a continuous, high-resolution image having a spatial resolution of H by W pixels. In this way, two relatively low spatial resolution DMD panels, i.e., DMD panels 201, 202, may produce an image having a higher spatial resolution than either DMD panel via in-engine tiling of the optical output of the DMD panels.

Figure 5C:
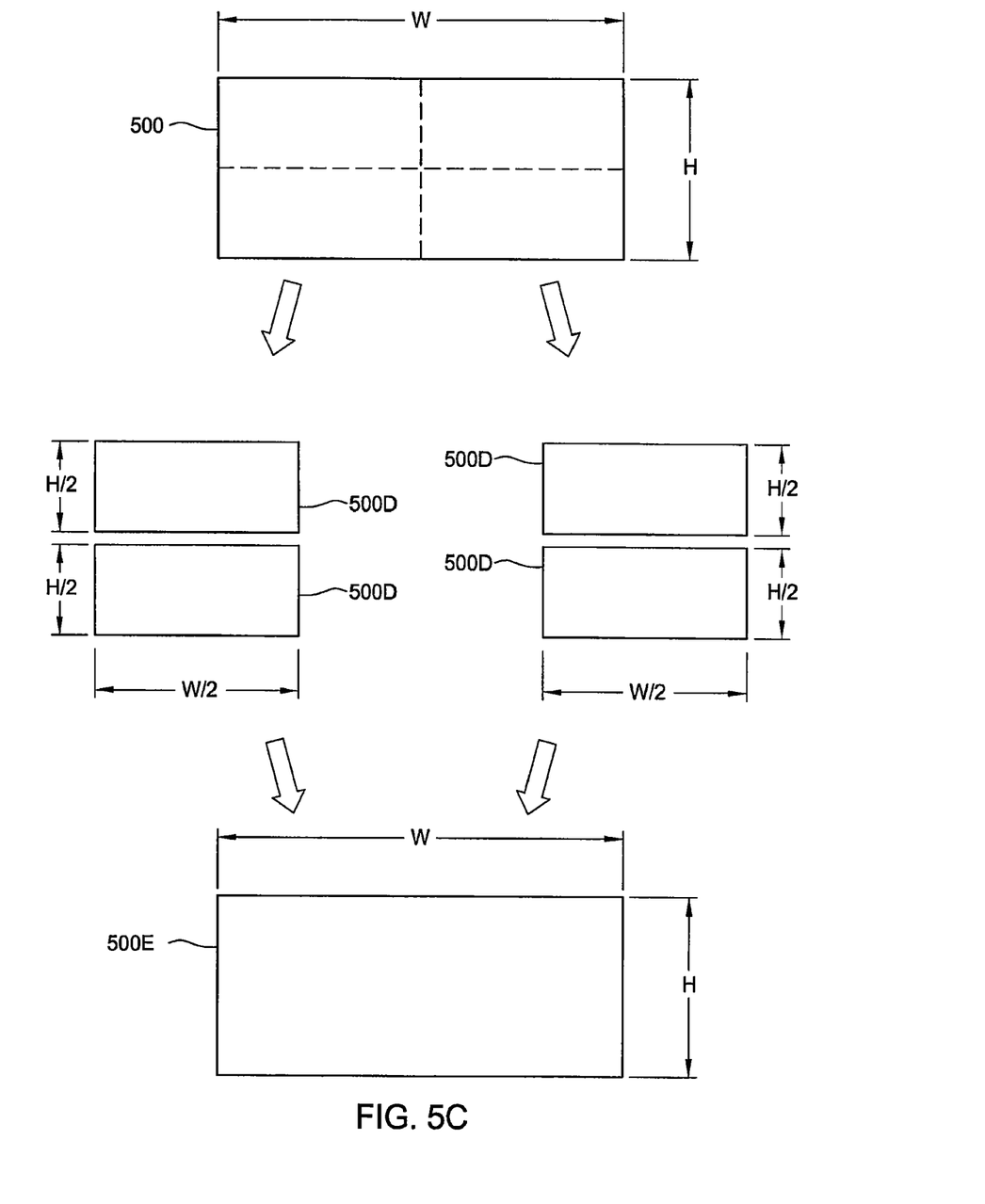
FIG. 5C illustrates an original image frame used to generate four subframe signals, according to an embodiment of the invention.

In another embodiment, a plurality of spatial light modulators having a lower spatial resolution is used to display a high spatial resolution image using in-engine tiling of the spatial light modulator output. For example, an 800×1200 pixel image can be displayed by four lower-resolution spatial light modulators, where each spatial light modulator has a resolution of 400×600 pixels. Alternatively, the effective pixel resolution of the lower-resolution spatial light modulators may exceed the pixel resolution of the high spatial resolution image due to limitations in the availability of off-the-shelf spatial light modulators. For example, a 1080×1920 pixel image can be displayed, using the in-engine tiling methods described herein, by four 576×1024 pixel spatial light modulators. Because the cost of a single 1080×1920 pixel spatial light modulator can be substantially greater than the cost of four 576×1024 pixel spatial light modulators, a significant savings in digital projection system cost can be realized by using in-engine tiling. In this embodiment, excess pixels provided by the tiled spatial light modulators are not used. FIG. 5C illustrates one example of this embodiment, in which original image frame 500 is used to generate four subframe signals 500D, where each of subframe signals 510D have a pixel height equal to one half of H and a pixel width equal to one half of W. When subframe signals 510D are projected adjacent each other, projected image frame 500E is generated having pixel height H and pixel width W, as shown. Other combinations of multiple spatial light modulators are also contemplated, such as a 2×3 array of spatial light modulators.

In this embodiment, as shown in FIGS. 5A-C, in-engine tiling of multiple subframes provides a resultant projected image having the same resolution as a high-resolution color image signal using multiple lower resolution spatial light modulators. Unlike conventional tiling schemes, however, only a single optical engine is required, greatly simplifying set-up and operation. For example, calibration of the intensity of multiple light sources is unnecessary, since a single optical engine containing a single light source is contemplated by embodiments of the invention to perform the in-engine tiling. In addition, only a single projection lens or optical assembly is needed, unlike in conventional tiling schemes, greatly simplifying alignment of projection optics.

Vertical in-engine tiling can be used, as described above in conjunction with FIG. 5C, to produce numerous useful combinations of tiled spatial light modulator arrays. For example, two VGA-formatted spatial light modulators, i.e., imagers having a pixel resolution of 640×480, can be vertically tiled and then rotated 90° to produce an image having a resultant resolution of 960×640. One skilled in the art will recognize that a 960×640 pixel image may be used to produce an SVGA formatted image, i.e., an image having a pixel resolution of 800×600. Similarly, two SVGA-formatted spatial light modulators, i.e., imagers having a pixel resolution of 800× 600, can be vertically tiled and then rotated 90° to produce an image having a resultant resolution of 1200×800. One skilled in the art will recognize that a 1200×800 pixel image may be used to produce an XGA formatted image, i.e., an image having a pixel resolution of 1024×768. In another example, two XGA-formatted spatial light modulators, i.e., imagers having a pixel resolution of 1024×768, can be vertically tiled and then rotated 90° to produce an image having a resultant resolution of 1536×1024. One skilled in the art will recognize that a 1536×1024 pixel image may be used to produce an SXGA formatted image, i.e., an image having a pixel resolution of 1280×1024. Other combinations of lower-resolution spatial light modulators are also contemplated, and the examples discussed herein are not intended to be limiting as to the scope of the invention. Extra pixels present in a tiled combination of lower-resolution subframe images need not be used to produce the resultant image.

To ensure that tiled subframe images used to produce a high-resolution resultant image are joined together in a visibly seamless manner, embodiments of the invention also contemplate methods for aligning tiled subframe images. In one embodiment, alignment of multiple projected subframe images is performed by using the subframe images to form an alignment image. For example, subframe signals 500A, 500B illustrated in FIG. 5A can be used to project an alignment image contained in projected image frame 500C. The alignment image is then used as the feed-back image for a mechanical alignment procedure. For example, once the alignment image is projected, the position of one or more optical components in the optical engine for each subframe, e.g., the spatial light modulator, prism assemblies, etc., are mechanically adjusted to align the subframe images as desired.

Figure 6:
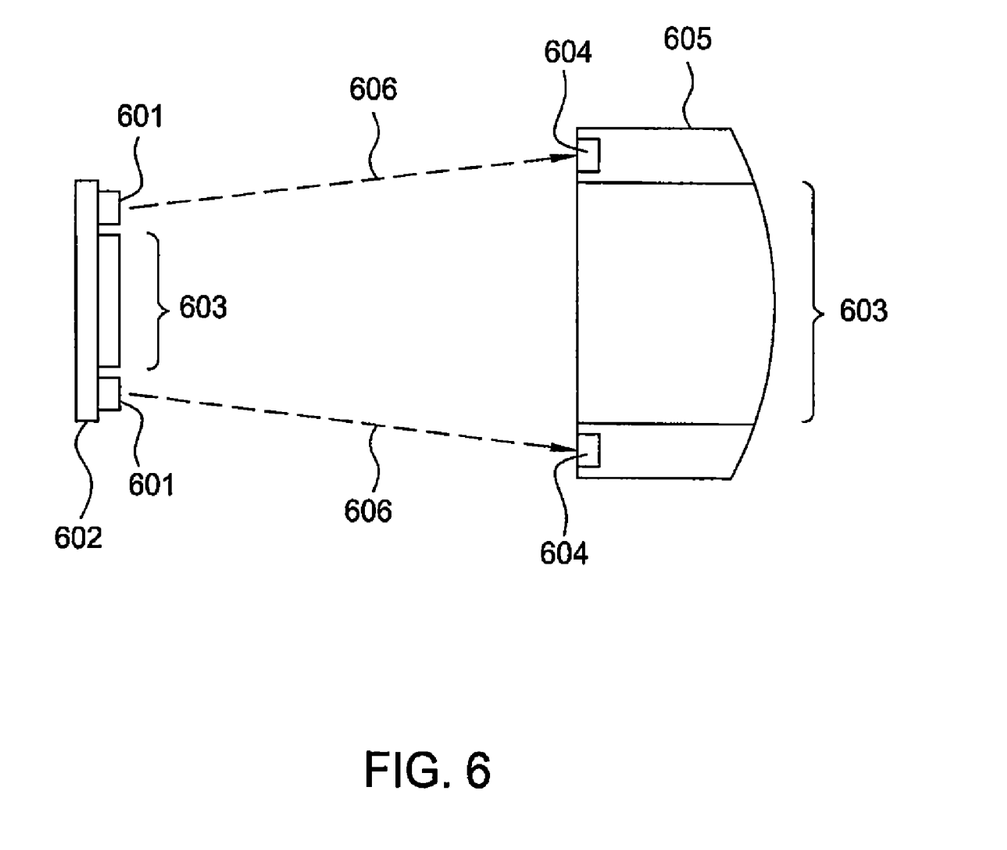
FIG. 6 illustrates alignment markers disposed on a spatial light modulator outside the image area of the spatial light modulator, according to an embodiment of the invention.

In another embodiment, illustrated in FIG. 6, alignment markers 601 are disposed at strategic locations on each spatial light modulator 602, e.g., outside the image area 603 at each corner of each spatial light modulator 602, and corresponding photo-sensors 604 are positioned around the periphery of the projection lens 605 of a optical engine (not shown). Alignment markers 601 may be located on the package for spatial light modulator 602, as shown, or on spatial light modulator 602 itself. Alignment markers 601 are used to project an optical marker signal 606 outside image area 603 and onto photo-sensors 604 for use as a feed-back signal, thereby allowing the automatic in-use alignment of spatial light modulator 602 relative to projection lens 605. In this way, each subframe image is projected in perfect alignment with neighboring subframe images. Alternatively, rather than mechanically repositioning each spatial light modulator to achieve final alignment, each subframe image can be electronically repositioned to compensate for any misalignment detected by the photo-sensors. In addition, it is contemplated that the optical characteristics of the peripheral columns and rows of pixel in each subframe may be interpolated with respect to neighboring subframes in order to smooth potential optical artifacts resulting from the tiling process.

In yet another embodiment, alignment of subframe images is achieved by using the previously described mechanical adjustment based on an alignment image as a coarse adjustment of each subframe image. Alignment markers disposed on the spatial light modulator are then used in conjunction with photo-sensors, as described above, as the fine adjustment.

While the foregoing is directed to embodiments of the present invention, other and further embodiments of the invention may be devised without departing from the basic scope thereof, and the scope thereof is determined by the claims that follow.

What is claimed is:

1. A method of displaying an image, comprising:
receiving a digital image signal having a first resolution;
creating a first and a second subframe image from the digital image signal, wherein the first and second subframe images each have a second resolution and are of the same color; and
projecting the first subframe image and the second subframe image substantially simultaneously onto a focal plane,
wherein the second subframe image is spatially offset from the first subframe image by an offset distance that is substantially equal to a width of the first subframe image.

2. The method of claim 1, wherein creating the first and the second subframe images comprises generating a first subframe image from a first subframe signal and generating a second subframe image from a second subframe signal.

3. The method of claim 2, wherein the first subframe image and the second subframe image are formed using a resolution reduction and interpolation algorithm.

4. The method of claim 1, wherein the second resolution is less than the first resolution.

5. The method of claim 1, wherein creating a first and a second subframe image comprises:

creating the first subframe image using a first spatial light modulator; and creating the second subframe image using a second spatial light modulator.

6. The method of claim 5, wherein creating the first and the second subframe images comprises illuminating a first and a second MEMS micro-mirror array with an LED-based or laser-based light source and reflecting at least a portion of the light delivered from the LED-based or laser-based light source.

7. The method of claim 1, wherein the first subframe image is projected onto a first portion of a focal plane and the second subframe image is projected onto a second portion of a focal plane, wherein no more than 10% of the surface area of the first subframe image overlaps with the second subframe image.

8. A method of displaying an image, comprising:

receiving a digital image signal;

creating a first and a second subframe image from the digital image signal; and projecting the first subframe image and the second subframe image substantially simultaneously onto a focal plane, wherein the second subframe image is spatially offset from the first subframe image by an offset distance, and no more than 10% of the surface area of the first subframe image overlaps with the second subframe image.

9. The method of claim 8, wherein the digital image signal has a first resolution and the combined resolution of the first and second subframe images is greater than the first resolution.

10. A system for displaying an image, comprising:

an image processing unit adapted to define a first subframe signal and a second subframe signal from a digital image source and to transmit the first subframe signal to a first imager assembly and the second subframe signal to a second imager assembly;

a first imager assembly configured to convert a first subframe signal to a first subframe image that is delivered to a focal plane; and a second imager assembly configured to convert a second subframe signal to a second subframe image that is delivered to the focal plane substantially simultaneously with the first subframe, wherein the second subframe image is offset from the first subframe image by an offset distance that is substantially equal to a width of the first subframe image and is of the same color as the first subframe image.

11. The system of claim 10, wherein the image processing unit is further adapted to define the second subframe signal as being offset from the first subframe signal by the offset distance.

12. The system of claim 10, wherein the components of the first imager assembly and the components of the second imager assembly are fixed and spatially offset to project the second subframe image the offset distance from the first subframe image on the focal plane.

13. The system of claim 10, wherein the image processing unit is configured with a resolution reduction and interpolation algorithm for defining the first subframe signal and the second subframe signal.

14. The system of claim 13, further comprising a light source, wherein the first imager assembly comprises a first micro-mirror array panel positioned to be illuminated by the light source and configured to generate the first subframe image, and the second imager assembly comprises a second micro-mirror array panel positioned to be illuminated by the light source and configured to generate the second subframe image.

15. The system of claim 13, further comprising a light source, wherein the first imager assembly comprises a first high-temperature polysilicon transmissive panel positioned to be illuminated by the light source and configured to generate the first subframe image, and the second imager assembly comprises a second high-temperature polysilicon transmissive panel positioned to be illuminated by the light source and configured to generate the second subframe image.

16. The system of claim 10, wherein the first and second subframe signals each have a lower spatial resolution than the digital image source.

17. The system of claim 10, wherein the first imager assembly is further configured to provide the first subframe image that is delivered to the focal plane and the second imager assembly is further configured to provide the second subframe image that is delivered to the focal plane, wherein no more than 10% of the surface area of the first subframe image overlaps with the second subframe image.

18. The method of claim 1, wherein the single-color image frame is a primary-color image frame.

19. The system of claim 10, wherein no more than 10% of the surface area of the first subframe image overlaps with the second subframe image.

* * * * *